United States Patent
Maeda et al.

(10) Patent No.: US 9,711,175 B2
(45) Date of Patent: Jul. 18, 2017

(54) MAGNETIC-DISK SUBSTRATE HAVING A SMALL WAVINESS, FOR USE AS A MAGNETIC DISK, AND A MAGNETIC-DISK DRIVE DEVICE FOR USE WITH THE MAGNETIC DISK

(71) Applicant: HOYA CORPORATION, Tokyo (JP)

(72) Inventors: Takashi Maeda, Nirasaki (JP); Takumi Kuhara, Hokuto (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 15/107,764

(22) PCT Filed: Dec. 26, 2014

(86) PCT No.: PCT/JP2014/084703
§ 371 (c)(1),
(2) Date: Jun. 23, 2016

(87) PCT Pub. No.: WO2015/099178
PCT Pub. Date: Jul. 2, 2015

(65) Prior Publication Data
US 2016/0329073 A1    Nov. 10, 2016

(30) Foreign Application Priority Data
Dec. 26, 2013   (JP) .................................. 2013-270031

(51) Int. Cl.
*G11B 5/73*    (2006.01)
*G11B 5/82*    (2006.01)

(52) U.S. Cl.
CPC .............. *G11B 5/7315* (2013.01); *G11B 5/73* (2013.01); *G11B 5/82* (2013.01)

(58) Field of Classification Search
None
See application file for complete search history.

(56) References Cited

U.S. PATENT DOCUMENTS

| 8,241,516 B2 | 8/2012 | Fujii et al. |
| 8,394,516 B2 | 3/2013 | Matsumoto et al. |
| 2006/0166041 A1 | 7/2006 | Takeda et al. |
| 2007/0003796 A1 | 1/2007 | Isono et al. |
| 2008/0291578 A1 | 11/2008 | Ono et al. |

(Continued)

FOREIGN PATENT DOCUMENTS

| CN | 1579706 A | 2/2005 |
| CN | 1880254 A | 12/2006 |

(Continued)

OTHER PUBLICATIONS

International Search Report in PCT/JP2014/084703 dated Mar. 3, 2015.

*Primary Examiner* — Craig A. Renner
(74) *Attorney, Agent, or Firm* — Global IP Counselors, LLP

(57) ABSTRACT

When waviness having a wavelength component of 10 to 500 μm in the circumferential direction of a main surface of a disk-shaped substrate is acquired and slopes are acquired from the waviness at an interval of 50 to 100 μm, the substrate being used in a magnetic disk on which recording or reading is performed using a DFH head, an average value of absolute values of the slopes is $0.45 \times 10^{-4}$ or less. This magnetic-disk substrate is used in a magnetic disk and a magnetic-disk drive device.

13 Claims, 2 Drawing Sheets

(56) References Cited

U.S. PATENT DOCUMENTS

| | | |
|---|---|---|
| 2010/0040907 A1 | 2/2010 | Takizawa et al. |
| 2010/0273030 A1 | 10/2010 | Kitsunai et al. |
| 2013/0136952 A1 | 5/2013 | Yukimatsu et al. |

FOREIGN PATENT DOCUMENTS

| | | |
|---|---|---|
| CN | 101312049 A | 11/2008 |
| CN | 103189917 A | 7/2013 |
| JP | H08-279134 A | 10/1996 |
| JP | 2008234823 A | 10/2008 |
| JP | 2011-104713 A | 6/2011 |
| JP | 4977795 B1 | 7/2012 |
| JP | 2013089264 A | 5/2013 |
| JP | 2013114730 A | 6/2013 |
| JP | 2013225372 A | 10/2013 |
| WO | 02076675 A1 | 10/2002 |

MAGNETIC-DISK SUBSTRATE HAVING A SMALL WAVINESS, FOR USE AS A MAGNETIC DISK, AND A MAGNETIC-DISK DRIVE DEVICE FOR USE WITH THE MAGNETIC DISK

CROSS-REFERENCE TO RELATED APPLICATIONS

This U.S. National stage application of International Patent Application No. PCT/JP2014/084703, filed on Dec. 26, 2014, which, in turn, claims priority under 35 U.S.C. §119(a) to Japanese Patent Application No. 2013-270031, filed in Japan on Dec. 26, 2013, the entire contents of which are hereby incorporated herein by reference.

BACKGROUND

Field of the Invention

The present invention relates to a magnetic-disk substrate, a magnetic disk, and a magnetic-disk drive device.

Background Information

BACKGROUND ART

Nowadays, in order to record data, hard disk drives (HDDs) are incorporated in personal computers, DVD (digital versatile disc) recording devices, or the like. In particular, a magnetic disk obtained by providing a magnetic recording layer on a substrate is used in a hard disk drive used in a device for which portability is a prerequisite, such as a laptop personal computer, and magnetic recording information is recorded in or read from the magnetic recording layer with a magnetic head that flies slightly away from the surface of the magnetic disk. A glass substrate is preferably used as a magnetic-disk substrate due to the fact that it has a property of being unlikely to undergo plastic deformation compared to a metal substrate (an aluminum alloy substrate) or the like.

Also, in order to meet the demand for an increase in the storage capacity of hard disk drives, attempts have been made to increase the magnetic recording density. For example, the magnetic recording information area (the recording bit) has been made smaller using a perpendicular magnetic recording method in which the direction of magnetization in the magnetic recording layer is perpendicular to the surface of the substrate. In a perpendicular magnetic recording magnetic disk, an adherent layer, a soft under layer (SUL), a base layer, a magnetic recording layer, a protecting layer, a lubricant layer, and the like are formed on a metal substrate or a glass substrate in the stated order, for example. The storage capacity of one disk substrate can be increased by adopting a perpendicular magnetic recording system. Furthermore, in order to further increase the storage capacity, the distance from the magnetic recording layer is made extremely short by allowing only a recording and reproduction element portion of the magnetic head to further protrude from the slider surface toward the magnetic disk, thus further improving the accuracy of the recording and reproduction of information (improving the S/N ratio). Note that the control of the recording and reproduction element portion of the magnetic head is called a DFH (dynamic flying height) control mechanism, and a magnetic head provided with this control mechanism is called a DFH head. In order to avoid collision and contact with the magnetic head or the recording and reproduction element portion that further protrudes therefrom, a magnetic-disk glass substrate used in an HDD in combination with this DFH head is produced such that the surface unevenness of the substrate is as small as possible.

The DFH control mechanism is a mechanism that performs control so as to make the distance from the head surface to the surface of the magnetic disk close to several nanometers by controlling the expansion of a reading element and writing element (collectively referred to as a "R/W element portion" hereinafter) of the head through providing a heater coil around the R/W element portion and controlling electric current that flows through the heater coil. In this case, in order to stably perform writing to or reading from the magnetic disk for a long period, it is not preferable that the surface of the magnetic disk comes into contact with the R/W element portion and the R/W element portion undergoes abrasion. Therefore, it is preferable that the surface of the magnetic disk is a smooth surface having small waviness, and in particular, the waviness of the glass substrate, which is a substrate for the magnetic disk, needs to be extremely small.

Under such a circumstance, a glass substrate for a magnetic recording medium in which a change amount of the microwaviness of the entire surface of a recording and reproduction region of the glass substrate for a magnetic recording medium is controlled in a predetermined range is known (Japanese Patent No. 4977795).

Specifically, the main flat surface of the glass substrate for a magnetic recording medium is such that upon measuring the microwavinesses (nWq) of grid-like evaluation regions that are set on the entire main flat surface including the entire surface of a region that serves as the recording and reproduction region when the glass substrate is used to prepare a magnetic disk, a percentage of an absolute value ($\Delta$nWq) of a change amount of microwavinesses between one evaluation region and an evaluation region adjacent thereto, relative to the microwaviness of the one evaluation region (change percentage) is 10% or less. Also, an average value of the microwavinesses (nWq) measured in these grid-like evaluation regions is 0.080 nm or less. The microwaviness has a period (a wavelength) of 0.2 µm to 1.8 µm.

SUMMARY

However, when a magnetic layer was formed on the above-described glass substrate to produce a magnetic disk and the characteristics of the DFH head were evaluated, an abrasion mark was confirmed on the tip of the R/W element portion. This was caused by the R/W element portion coming into contact with the surface of the magnetic disk and being rubbed.

In view of this, an object of the present invention is to provide a magnetic-disk substrate, a magnetic disk, and a magnetic-disk drive device with which abrasion of the R/W element portion of the DFH head can be suppressed when recording or reading is performed using the DFH head.

An aspect of the present invention is a disk-shaped magnetic-disk substrate having a pair of main surfaces. When waviness having a wavelength component of 10 to 500 µm on a main surface of the magnetic-disk substrate is acquired in a circumferential direction of the main surface and slopes are acquired from the waviness at an interval of 50 to 100 µm on the substrate, an average value of absolute values of the slopes is $0.45 \times 10^{-4}$ or less.

It is preferable to perform processing such that a ratio (Ra_rad/Ra_cir) between an arithmetic average roughness Ra_rad in a radial direction of the main surface and an arithmetic average roughness Ra_cir in the circumferential direction is in a range of 0.95 to 1.05.

Also, it is preferable that a root mean square roughness Rq of waviness having a wavelength component of 10 to 500 μm is 0.04 nm or less. It is more preferable that the root mean square roughness Rq is 0.38 nm or less.

Another aspect of the present invention is a magnetic disk in which a magnetic layer is formed on the main surface of the magnetic-disk substrate.

Still another aspect of the present invention is a magnetic-disk drive device including the magnetic disk, a spindle for fixing the magnetic disk, and a magnetic head.

According to the above-described magnetic-disk substrate, magnetic disk, and magnetic-disk drive device, when recording or reading is performed using the DFH head, abrasion of the R/W element portion of the DFH head can be suppressed.

DESCRIPTION OF EMBODIMENTS

Figure 1:
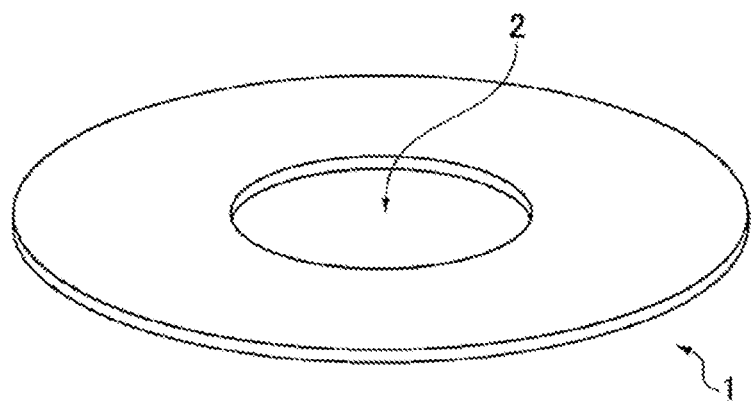
FIG. 1 is a diagram showing the external shape of a magnetic-disk glass substrate of this embodiment.
Figure 2A:
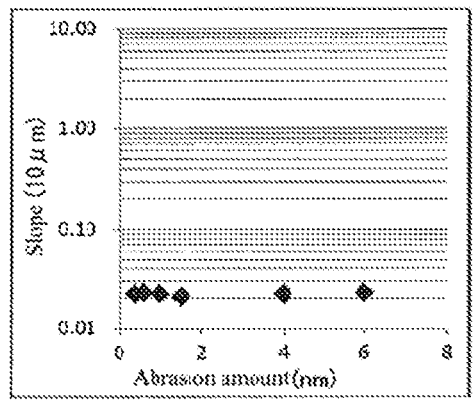
FIGS. 2A to 2D are diagrams showing relationships between slopes of wavinesses at certain pitch lengths and abrasion amounts.
Figure 2D:
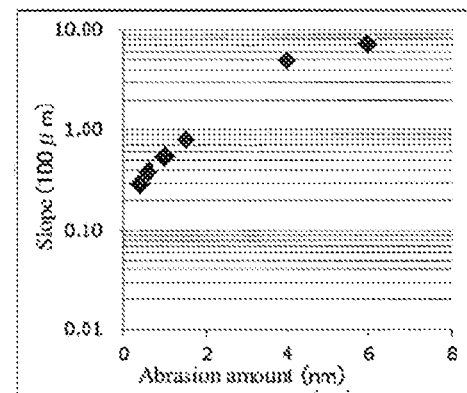
Figure 2B:
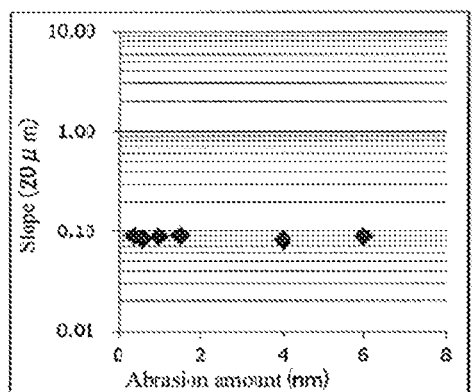
Figure 2C:
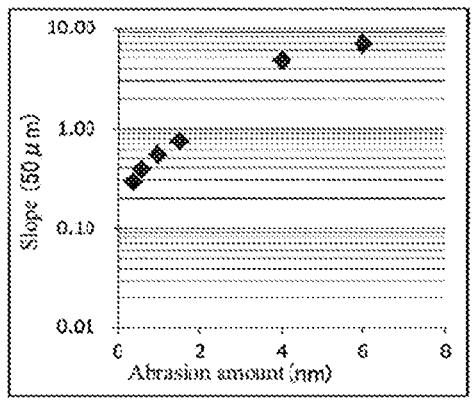

Hereinafter, a magnetic-disk substrate, a magnetic disk, and a magnetic-disk drive device of the present invention will be described in detail. Note that although a magnetic-disk glass substrate will be described hereinafter, a magnetic-disk substrate may be a metal substrate (for example, an aluminum alloy substrate).

Conventionally, with respect to the waviness of a surface of a magnetic-disk substrate typified by a magnetic-disk glass substrate, the surface of the substrate has been ground and polished such that waviness having a dimension equal to the size of the entire DFH head, or specifically, having a wavelength of 60 μm to 500 μm or of 60 μm to 1000 μm is reduced. However, abrasion of the tip of the R/W element portion could not be reduced with this reduction in waviness. Thus, when studying the relationship between the results of measurement of abrasion amounts of the tip of the R/W element portion of the DFH head and the waviness of main surfaces of a magnetic-disk substrate, the inventor of the present invention found that the waviness having a wavelength in a specific range on a surface of the substrate caused abrasion. Specifically, the inventor found that the waviness on the surface of the magnetic-disk substrate having a wavelength that corresponds to the size of the R/W element portion protruding toward the magnetic disk from the surface of the tip of the R/W element portion that is opposite to the magnetic disk, that is, from the slider surface, affected abrasion. More specifically, the inventor of the present invention found that there was a strong correlational relationship between an average value of the slopes of the waviness having the above-described wavelength and the magnitude of abrasion of the protruding R/W element portion, and the inventor invented a magnetic-disk substrate having the following aspects. Note that it is conceivable that the above-described phenomenon is caused by the size of the protruding portion of the R/W element portion being smaller than the size of the slider surface (the size of the entire DFH head).

Abrasion Testing for R/W Element Portion

The abrasion testing for the R/W element portion of the DFH head in this specification is performed as follows.

Specifically, abrasion testing for the R/W element is performed for 15 minutes by making the R/W element portion of the DFH head fly with a back-off amount of 0.2 nm at an abrasion measurement position located a fixed distance away from the center of the magnetic disk and rotating the magnetic disk. Note that the "back-off amount" indicates an amount of returning from a location at which the R/W element portion is brought into contact with the magnetic disk by causing the R/W element portion to protrude. For example, if the back-off amount is 0.5 nm, the minimum distance between the head and the magnetic disk is 0.5 nm. Note that usually, a gap between the magnetic disk and a portion other than the R/W element portion of the slider surface of the head is about 10 nm. Before and after this abrasion testing, an electric current value that flows through a heater coil when the R/W element portion touches down is measured as a protruding amount of the R/W element portion obtained when the R/W element portion comes into contact (touches down) with the surface of the magnetic disk when the R/W element portion is caused to gradually protrude at the same radius position that is located a predetermined distance away from the center of the magnetic disk and is different from the above-described abrasion measurement position. Therefore, the larger a difference in the electric current before and after the abrasion testing is, the larger the abrasion amount is. Note that control may be performed at a supplied power instead of the electric current value.

Measurement of Waviness

"Waviness" referred to in this specification is measured as follows.

That is, the surface shape data on a main surface of a circular magnetic-disk glass substrate is acquired using an optical surface analyzer with a laser beam. At this time, it is preferable to use a laser doppler vibrometer having a high measurement sensitivity to waviness having a relatively short wavelength bandwidth.

In an embodiment described hereinafter, the shape of waviness does not change due to film formation, and thus the surface shape data is acquired from a magnetic-disk substrate before the film formation. Data on the surface shape in the circumferential direction of the magnetic-disk glass substrate is acquired in this embodiment. When data is acquired, the shape of waviness having a wavelength bandwidth of 10 to 500 μm is measured by performing filtering using a band-pass filter.

Measurement of Slope of Waviness

As described above, when one dimensional data on the waviness is acquired, the slope of the waviness referred to in this specification is found by extracting height data at an interval of $\Delta x$ that is determined in advance using a random position as a starting position, or for example, at an interval of 50 μm, and obtaining the slope between pieces of the extracted height data. The slope is $(z2-z1)/\Delta x$ where values of two adjacent pieces of extracted data are $z1$ and $z2$. Even if a random position is used as the starting position for calculating a slope as described above, the value of a stable slope can be found by finding and averaging the absolute values of such slopes. As described hereinafter, an average value of the absolute values of slopes of waviness on a main surface of a magnetic-disk glass substrate is found in the present embodiment. In particular, if the slopes of the waviness in the circumferential direction of a magnetic-disk glass substrate are evaluated, it is preferable that waviness data on one turn in the circumferential direction centered about the central axis of the magnetic-disk glass substrate is used to find an average value of the absolute values of the slopes of data on one turn, because a more stable evaluation is performed.

Magnetic-Disk Glass Substrate

Aluminosilicate glass, soda-lime glass, borosilicate glass, and the like can be used as a material for the magnetic-disk glass substrate in the present embodiment. In particular, aluminosilicate glass can be preferably used in that chemical strengthening can be performed, and a magnetic-disk glass substrate that is excellent in flatness of main surfaces and substrate strength can be produced. Amorphous aluminosilicate glass can also be used as a material for the magnetic-disk glass substrate in the present embodiment. Also, an aluminum alloy substrate that is plated with a NiP-based metal film can be used as well.

FIG. 1 is a diagram showing the external shape of a magnetic-disk glass substrate of the present embodiment. As shown in FIG. 1, a magnetic-disk glass substrate 1 of the present embodiment is a disk-shaped thin glass substrate having an inner hole 2. Although there is no limitation on the size of the magnetic-disk glass substrate, this magnetic-disk glass substrate is preferable as a magnetic-disk glass substrate having a nominal diameter of 2.5 inches, or 3.5 inches, for example.

The magnetic-disk glass substrate has a pair of main surfaces, a side wall surface disposed along the direction orthogonal to the pair of main surfaces, and a pair of chamfered surfaces disposed between the pair of main surfaces and the side wall surface. The side wall surface and the chamfered surfaces are formed on an outer circumferential side edge portion and an inner circumferential side edge portion of the magnetic-disk glass substrate.

In addition to amorphous glass, the magnetic-disk glass substrate of the present embodiment may be crystallized glass (crystal glass). The impact resistance of the glass substrate is increased by increasing the hardness thereof using crystallized glass.

On such a magnetic-disk glass substrate, when the waviness having a wavelength component of 10 to 500 µm on a main surface of the magnetic-disk substrate is acquired in the circumferential direction of the main surface centered about the central axis of the magnetic-disk substrate and a slope is acquired from the waviness at an interval of 50 to 100 µm, an average value of absolute values of the slopes is $0.45 \times 10^{-4}$ or less. As described later, a magnetic disk produced using a magnetic-disk glass substrate can suppress abrasion of the R/W element portion of the DFH head when recording or reading is performed with the DFH head by the slope of the waviness of the main surface of the magnetic-disk glass substrate being adjusted in this manner. If abrasion of the R/W element portion occurs, the R/W element portion comes into contact with the surface layer of the magnetic disk, and thus it becomes difficult to perform stable recording or reading. Moreover, there is a concern that if abrasion of the R/W element portion advances, recording or reading cannot be performed and the DFH head and the magnetic disk will be damaged. Abrasion of the R/W element portion is such a small phenomenon that it has not been considered conventionally.

In the present embodiment, the reason why the waviness having a wavelength component of 10 to 500 µm is acquired at an interval of 50 to 100 µm is because the dimension of the R/W element portion is 50 to 100 µm and the slope of the waviness corresponding to the size of the protruding R/W element portion is to be found. As described later, the waviness having such a wavelength has a strong correlational relationship with an abrasion amount resulting from the R/W element portion coming into contact with the surface of the magnetic disk, being rubbed, and undergoing abrasion, or with the result of whether or not the R/W element portion undergoes abrasion. Furthermore, it is preferable that a root mean square roughness Rq of the waviness having a wavelength component of 10 to 500 µm is 0.04 nm or less because the DFH head stably flies and the flying height of the protruding R/W element portion is stably secured.

Magnetic Disk

A magnetic disk has a configuration in which at least an adherent layer, a base layer, a magnetic recording layer, a protecting layer, and a lubricant layer are stacked on the main surface of the magnetic-disk glass substrate in this order from the main surface side, for example. Of these layers, at least a magnetic recording layer is needed.

CrTi can be used in the adherent layer, Ru can be used in the base layer, and a CoCrPt-based alloy can be used in the magnetic recording layer, for example. The protecting layer is a carbon layer containing nitrogen, for example.

Also, a SUL (soft under layer), a seed layer, and the like may be formed between the adherent layer and the magnetic recording layer. Such a layer configuration can be found in paragraphs 0027 to 0032 of JP 2009-110626A, for example.

The magnetic disk is incorporated in a magnetic-disk drive device together with a spindle for fixing a magnetic disk and a magnetic head. That is, the magnetic-disk drive device includes a magnetic disk in which a magnetic layer is formed on the main surface of the above-described magnetic-disk glass substrate, the spindle for fixing a magnetic disk, and the magnetic head. Here, the magnetic head is preferably a magnetic head provided with a DFH mechanism.

Description of Method for Manufacturing Magnetic-Disk Glass Substrate

In the manufacturing method of the present embodiment, first, processing for molding a glass blank that serves as a raw material for a plate-shaped magnetic-disk glass substrate having a pair of main surfaces is performed. Next, the glass blank is roughly ground. Thereafter, shape processing and edge surface polishing are performed on the glass blank. Then, precision grinding is performed on a glass substrate obtained from the glass blank, using fixed abrasive particles. Thereafter, first polishing, chemical strengthening, and second polishing are performed on the glass substrate. Note that although the above-described processes are performed in the above-described flow in the present embodiment, it is not necessary to perform all of the above-described processes and these processes may be omitted as appropriate. Hereinafter, each of the processes will be described.

(a) Molding of Glass Blank

A press molding method may be used to mold the glass blank, for example. A circular glass blank can be obtained by a press molding method. Furthermore, a glass blank can be manufactured using a known manufacturing method such as a downdraw method, a redraw method, or a fusion method. A disk-shaped glass substrate, which is the base of a magnetic-disk glass substrate, can be obtained by appropriately performing shape processing on the plate-shaped glass blank produced with these known manufacturing methods.

(b) Rough Grinding

In rough grinding, main surfaces on both sides of the glass blank are ground. Loose abrasive particles are used as an abrasive material, for example. In rough grinding, grinding is performed such that the glass blank is brought approximately closer to a target substrate thickness and a target flatness of the main surfaces. Note that rough grinding is performed in accordance with the dimensional accuracy or the surface roughness of the molded glass blank, and may be omitted in some cases.

(c) Shape Processing

Next, shape processing is performed. In the shape processing, after the glass blank is molded, a circular hole is formed using a known processing method to obtain a disk-shaped glass substrate having the circular hole. Thereafter, chamfering is performed on edge surfaces of the glass substrate. Accordingly, side wall surfaces orthogonal to the main surfaces and chamfered surfaces that are inclined with respect to the glass main surfaces between the side wall surfaces and the glass main surfaces on both sides are formed on the edge surfaces of the glass substrate.

(d) Edge Surface Polishing

Next, edge surface polishing is performed on the glass substrate. Edge surface polishing is processing for performing polishing by supplying a polishing liquid containing loose abrasive particles between a polishing brush and the edge surfaces of the glass substrate and moving the polishing brush and the glass substrate relative to each other. In edge surface polishing, an inner circumferential side edge surface and an outer circumferential side edge surface of the glass substrate are polishing targets, and the inner circumferential side edge surface and the outer circumferential side edge surface are formed into mirror surfaces.

(e) Precision Grinding

Next, precision grinding is performed on the main surfaces of the glass substrate. For example, the main surfaces of the glass substrate are ground using a double-side grinding apparatus provided with a planetary gear mechanism. In this case, grinding is performed with the surface plates provided with fixed abrasive particles, for example. Alternatively, grinding is also performed using loose abrasive particles.

(f) First Polishing

Next, first polishing is performed on the main surfaces of the glass substrate. First polishing is performed using loose abrasive particles and polishing pads attached to the surface plates. First polishing removes cracks and warping remaining on the main surfaces in the case where grinding is performed with fixed abrasive particles, for example. In first polishing, a surface roughness of the main surface, or for example, an arithmetic average roughness Ra, can be reduced while preventing the shape of the edge portions of the main surfaces from excessively recessing or protruding.

Although there is no particular limitation on the loose abrasive particles used in first polishing, cerium oxide abrasive particles, zirconia abrasive particles, or the like are used, for example.

(g) Chemical Strengthening

The glass substrate can be chemically strengthened as appropriate. A melt obtained by heating potassium nitrate, sodium nitrate, or a mixture thereof, for example, is used as a chemical strengthening liquid. Moreover, by immersing the glass substrate in the chemical strengthening liquid, lithium ions and sodium ions in the glass composition that are present in a surface layer of the glass substrate are respectively substituted with sodium ions and potassium ions in the chemical strengthening liquid whose ion radii are relatively large, whereby compressive stress layers are formed on the surface layer portions and the glass substrate is strengthened.

Although the time at which chemical strengthening is performed is determined as appropriate, the polishing is particularly preferably performed after chemical strengthening, because the surface can be smoothed and foreign matter attached to the surface of the glass substrate can be removed by chemical strengthening. Also, chemical strengthening is performed as needed, and need not be performed.

(h) Second Polishing (Mirror-Polishing)

Next, second polishing is performed on the glass substrate that has undergone chemical strengthening. Second polishing is for performing mirror-polishing on the main surfaces. In second polishing as well, polishing is performed using a polishing apparatus having a configuration similar to that in first polishing. In second polishing, the type and the particle size of loose abrasive particles are changed relative to first polishing and mirror polishing is performed using resin polishers having a low hardness as the polishing pads. Doing so makes it possible to reduce the roughness of the main surfaces while preventing the shape of edge portions of the main surfaces from excessively recessing or protruding. In mirror polishing, it is preferable to perform polishing such that a surface roughness Ra found by measuring the roughness of a 1 μm×1 μm square area using an AFM (atomic force microscope) with a sampling number of 256×256, for example, is 0.3 nm or less.

(i) Third Polishing (Tape Polishing)

In third polishing, tape polishing, for example, is performed on the main surfaces of the glass substrate having a low roughness resulting from second polishing. In tape polishing, the main surfaces of the glass substrate are polished in the circumferential direction by bringing a tape-shaped polishing cloth into contact with the main surfaces of the substrate, which is rotated in the circumferential direction while a polishing slurry is supplied. In third polishing, when the waviness having a wavelength component of 10 to 500 μm in the circumferential direction of the main surface of the magnetic-disk glass substrate is acquired in the circumferential direction of the main surface at an interval of 50 to 100 μm by adjusting polishing conditions as appropriate, an average value of absolute values of slopes of the waviness of this main surface can be set to $0.45 \times 10^{-4}$ or less. Also, the above-described average value is more preferably $0.40 \times 10^{-4}$ or less, and is particularly preferably $0.30 \times 10^{-4}$ or less. Note that the lower limit of the above-described average value is $0.05 \times 10^{-4}$.

Also, in third polishing, in order to cause the DFH head stably to fly, it is preferable to perform polishing such that a root mean square roughness Rq of waviness having a wavelength component of 10 to 500 μm on the main surface of the magnetic-disk glass substrate is 0.04 nm or less. This waviness need only be measured using a laser doppler vibrometer, for example.

Tape polishing is performed with the following method, for example. That is, the magnetic-disk glass substrate, which is a target for performing tape polishing, is supported by and set on a rotatable spindle, and is driven so as to rotate at a predetermined speed. On the other hand, a polishing liquid containing a polishing material is supplied to a polishing tape wound around a roller, and this roller presses the polishing tape against both main surfaces of the magnetic-disk glass substrate. Accordingly, the main surfaces of the magnetic-disk glass substrate are polished by the polishing tape in the circumferential direction of the glass substrate. The polishing tape is made of woven fabric, nonwoven fabric, suede, or a foam such as polyurethane foam. An example of such polishing is disclosed in JP 2004-178777A. Here, it is preferable to use silica as the polishing agent. If diamond is used as the polishing agent, minute grooves are easily formed, whereas use of silica abrasive particles makes it possible to even out the waviness of the substrate surface in the circumferential direction without forming minute grooves. Doing this makes it possible to reduce the slope of the waviness in the circumferential direction. Note that the slope of the waviness in the circumferential direction can be controlled by changing a force of the polishing tape pressed against the glass substrate, for example.

The purpose of this tape polishing is not to form minute grooves (so-called texture) extending in the circumferential direction. If minute grooves are formed, there is a risk that the magnetic properties of the soft under layer, which will be described later, will deteriorate. That is, it is preferable that the surface roughness does not have anisotropy. At this time, it is preferable that the roughness in the radial direction of the main surface (direction orthogonal to the circumferential direction) is approximately equal to the roughness in the circumferential direction. Specifically, it is preferable to perform processing such that when the roughness of a 5 μm×5 μm square area is measured using an AFM (atomic force microscope), a ratio (Ra_rad/Ra_cir) of an average line roughness (Ra_rad) that is an arithmetic average roughness in the radial direction and an average line roughness (Ra_cir) that is an arithmetic average roughness in the circumferential direction is in a range of 0.95 to 1.05. It is preferable that the main surfaces of the glass substrate have isotropic roughnesses.

Also, it is preferable that the arithmetic average roughness (Ra) of the main surface of the glass substrate before tape polishing is performed is 0.3 nm or less. Also, it is preferable that the root mean square roughness Rq of the waviness having a wavelength component of 10 to 500 μm on the main surface of the glass substrate before tape polishing is performed is 0.1 nm or less. The slope of the waviness in the circumferential direction can be appropriately reduced by adjusting the roughness and waviness before tape polishing. Unlike polishing using a planetary gear mechanism of polishing surface plates, tape polishing of this specification does not perform polishing in random directions, and thus if the roughness or waviness is excessively large, there are cases where the substrate surface cannot be evened out in the circumferential direction due to unevenness in the polishing of the entire main surface.

Polishing is performed such that roughness decreases more than after second polishing by setting polishing conditions of tape polishing as appropriate. Since the surfaces of the glass substrate are polished in the circumferential direction, which is the same as a direction in which the magnetic head flies and moves relative to the magnetic disk, abrasion of the DFH head can be suppressed.

EXPERIMENTAL EXAMPLES

In order to examine the effect of the magnetic-disk glass substrate of the present embodiment, magnetic-disk glass substrates having main surfaces with various wavinesses were produced under different polishing conditions (Experimental Examples 1 to 8). Magnetic disks were produced by forming an adherent layer, a base layer, a magnetic recording layer, a protecting layer, and a lubricant layer on each magnetic-disk glass substrate.

Data on the surface shape having a wavelength component of 10 to 500 μm for one turn of the magnetic-disk glass substrate was acquired at a position located 20.86 mm away from the central axis (a radius of 20.86 mm) of the main surface of the magnetic-disk glass substrate before the magnetic disk was produced, using an optical surface analyzer (a laser doppler vibrometer).

At that time, since 65536 pieces of data were acquired per turn, a pitch distance between pieces of data was approximately 2.0 μm. Therefore, pieces of the acquired data were extracted every five pieces of data and were used as data for every 10 μm (a pitch of 10 μm), similarly, pieces of the data were extracted every ten pieces of data and were used as data for every 20 μm (a pitch of 20 μm), and similarly, pieces of the data were extracted every 50 pieces of data and every 100 pieces of data, and were respectively used as data for every 50 μm and as data for every 100 μm (a pitch of 50 μm, a pitch of 100 μm). The average value of the absolute values of the slopes of the waviness was calculated using the obtained data. Note that similarly, when the average values of the absolute values of the slopes of wavinesses at several other radius positions were calculated, values that were substantially equal to that at a radius of 20.86 mm were obtained, and the average value of the absolute values of the slopes of wavinesses did not change in accordance with the position in the radial direction. Note that with regard to all the substrates, a root mean square roughness Rq of the waviness having a wavelength component of 10 to 500 μm was 0.04 nm or less.

On the other hand, abrasion testing on the R/W element portion of the DFH head was performed using a magnetic disk produced from this magnetic-disk glass substrate. The abrasion testing was the above-described testing. In abrasion testing, the DFH head was caused to fly with a back-off amount of 0.2 mm at a fixed position located 20.86 mm away from the central axis of the main surface of the magnetic-disk glass substrate. The flying height of the R/W element portion was found by obtaining the difference between the value of an electric current that flowed through a heater coil when the R/W element portion touched down and the value of an electric current that currently flows through the heater coil. That is, thermal expansion of the R/W element portion decreases by a decrease in the electric current value, and thus the flying height of the R/W element portion can be found using a difference in the electric current whose value was reduced from the electric current value at the time of the touchdown. Note that a relationship between the electric current value and a protruding amount can be plotted and recorded in advance with a magnetic head to be used. Usually, the plotting indicates a proportional relationship.

Also, before and after the abrasion testing, the R/W element portion was caused to touch down by allowing an electric current to flow through the heater coil provided around the R/W element portion at a position located 22.0 mm away from the central axis of the magnetic disk. A value A of an electric current that flowed through the heater coil (before abrasion testing) and a value B of an electric current (after abrasion testing) were found at that time.

A difference between the value A and the value B of the electric current corresponds to an abrasion amount of the R/W element portion in abrasion testing. The difference was converted to the abrasion amount by multiplying this difference between these values by a coefficient. Note that if the abrasion amount is 0.8 nm or less, the abrasion amount is substantially not problematic. This is because if the abrasion amount is such an amount, the protecting film on the surface of the head slider sufficiently remains.

The slopes of wavinesses of Experimental Examples 1 to 8 and the abrasion amounts are expressed using a graph in this manner, and whether or not the slopes of wavinesses and the abrasion amounts have a correlational relationship was studied. Table 1 below shows the results of Experimental Examples 1 to 8.

TABLE 1

| | Abrasion amount (nm) | Pitch length | | | |
|---|---|---|---|---|---|
| | | 10 μm | 20 μm | 50 μm | 100 μm |
| Exp. Ex. 1 | 0.2 | 0.022 | 0.090 | 0.220 | 0.220 |
| Exp. Ex. 2 | 0.4 | 0.022 | 0.089 | 0.287 | 0.287 |
| Exp. Ex. 3 | 0.6 | 0.023 | 0.084 | 0.385 | 0.385 |
| Exp. Ex. 4 | 0.8 | 0.022 | 0.088 | 0.448 | 0.450 |
| Exp. Ex. 5 | 1.0 | 0.022 | 0.088 | 0.538 | 0.542 |
| Exp. Ex. 6 | 1.5 | 0.021 | 0.089 | 0.746 | 0.781 |
| Exp. Ex. 7 | 4.0 | 0.022 | 0.080 | 4.734 | 4.955 |
| Exp. Ex. 8 | 6.0 | 0.023 | 0.088 | 6.963 | 7.168 |

FIGS. 2A to 2D are diagrams showing the relationship between abrasion amounts and the slopes of wavinesses at the pitch lengths of 10 μm, 20 μm, 50 μm, and 100 μm of pieces of data for an abrasion amount of 0.4 mm, 0.6 mm, 1.0 mm, 1.5 mm, 4.0 mm, and 6.0 mm of Experimental Examples 1 to 8 in Table 1 above.

As shown in FIGS. 2A to 2D, the logarithms of the slopes of the wavinesses at the pitch lengths of 50 μm and 100 μm have a correlational relationship with the abrasion amounts in the R/W element portion. It is found that at this time, the more the slope of the waviness is reduced, the more the abrasion amount decreases. In particular, a substantially linear correlational relationship is obtained up to the abrasion amount being about 4 nm or less. Based on this relationship, if the abrasion amount is to be 0.8 nm or less, the average value of absolute values of the slopes need only be $0.45 \times 10^{-4}$ or less.

Note that when a correlational relationship with abrasion amounts in the R/W element portion was studied with regard to the case where the pitch length was 200 μm and 500 μm, there was significant variation and a clear correlational relationship was not obtained.

The abrasion amount can be set to a value according to which the life of a HDD is not significantly affected in terms of practical use by, when the waviness having a wavelength component of 10 to 500 μm in the circumferential direction of the main surface of the magnetic-disk substrate is acquired and the slopes at an interval of 50 to 100 μm are acquired from the waviness, setting an average value of absolute values of the slopes to $0.45 \times 10^{-4}$ or less. More preferably, the above-described average value is set to $0.40 \times 10^{-4}$ or less.

As described above, although a magnetic-disk substrate, a magnetic disk, and a magnetic-disk drive device according to the present invention have been described in detail, the present invention is not limited to the above-described embodiment and working examples, and it will be appreciated that various improvements and modifications can be made without departing from the gist of the present invention.

The invention claimed is:

1. A disk-shaped magnetic-disk substrate comprising:
at least one main surface, configured such that when waviness having a wavelength component of 10 μm to 500 μm on the main surface is acquired in a circumferential direction of the main surface and slopes are acquired from the waviness at an interval of 50 μm to 100 μm, an average value of absolute values of the slopes is $0.45 \times 10^{-4}$ or less.

2. The magnetic-disk substrate according to claim 1, wherein
processing is performed such that a ratio Ra_rad/Ra_cir between an arithmetic average roughness Ra_rad in a radial direction of the main surface and an arithmetic average roughness Ra_cir in the circumferential direction is in a range of 0.95 to 1.05.

3. The magnetic-disk substrate according to claim 1, wherein
a root mean square roughness Rq of waviness having a wavelength component of 10 μm to 500 μm is 0.04 nm or less.

4. A magnetic disk in which a magnetic layer is formed on the main surface of the magnetic-disk substrate according to claim 1.

5. A magnetic-disk drive device comprising:
the magnetic disk according to claim 4;
a spindle fixing the magnetic disk; and
a magnetic head.

6. The magnetic-disk substrate according to claim 2, wherein
a root mean square roughness Rq of waviness having a wavelength component of 10 μm to 500 μm is 0.04 nm or less.

7. A magnetic disk in which a magnetic layer is formed on the main surface of the magnetic-disk substrate according to claim 2.

8. A magnetic disk in which a magnetic layer is formed on the main surface of the magnetic-disk substrate according to claim 3.

9. A magnetic disk in which a magnetic layer is formed on the main surface of the magnetic-disk substrate according to claim 6.

10. A magnetic-disk drive device comprising:
the magnetic disk according to claim 7;
a spindle fixing the magnetic disk; and
a magnetic head.

11. A magnetic-disk drive device comprising:
the magnetic disk according to claim 8;
a spindle fixing the magnetic disk; and
a magnetic head.

12. A magnetic-disk drive device comprising:
the magnetic disk according to claim 9;
a spindle fixing the magnetic disk; and
a magnetic head.

13. The magnetic-disk substrate according to claim 1, wherein the at least one main surface comprises a pair of main surfaces.

* * * * *